United States Patent [19]

Siems et al.

[11] 3,996,553
[45] Dec. 7, 1976

[54] SEISMIC DATA TELEMETERING SYSTEM

[75] Inventors: Lee E. Siems; Paul M. Morgan, both of Houston, Tex.

[73] Assignee: Western Geophysical Company of America, Houston, Tex.

[22] Filed: May 12, 1975

[21] Appl. No.: 576,943

[52] U.S. Cl. .................... 340/15.5 TS; 179/15 AL; 340/185; 325/31
[51] Int. Cl.² .......................................... G01V 1/22
[58] Field of Search ........ 179/15 AL; 340/15.5 TS, 340/15.5 TC, 16 C, 174 SY, 150, 151, 185, 167 A, 167 B; 325/31, 153–155; 178/DIG. 64, 13

[56] References Cited
UNITED STATES PATENTS

| | | | |
|---|---|---|---|
| 2,723,309 | 11/1955 | Lair et al. | 179/15 AL |
| 3,105,197 | 9/1963 | Aiken | 340/167 B |
| 3,652,979 | 3/1972 | Angelle | 340/15.5 TS |
| 3,748,638 | 7/1973 | Montgomery | 340/15.5 TS |
| 3,883,691 | 5/1975 | Pilc et al. | 340/151 |
| 3,886,494 | 5/1975 | Kostalmicak et al. | 340/15.5 TS |

FOREIGN PATENTS OR APPLICATIONS

| | | | |
|---|---|---|---|
| 656,736 | 1/1963 | Canada | 340/167 B |

*Primary Examiner*—Nelson Moskowitz
*Attorney, Agent, or Firm*—William A. Knox

[57] ABSTRACT

A plurality of data acquisition units are connected to a central signal processor through a common telemeter link. The telemeter link includes a data channel, an interrogation channel and a control channel. The central signal processor sends an interrogation signal through the interrogation channel to the data acquisition units. As each data acquisition unit recognizes the interrogation signal, it transmits its acquired data back to the central signal processor through the data channel. Any selected data acquisition unit, when it receives a control signal through the control channel at the same time that it receives an interrogation signal through the interrogation channel, can be caused to perform a function different from all other units. The signal propagation velocity through the control channel is different from the signal propagation velocity through the interrogation channel. One of the two signals may be transmitted through the faster channel at a selected time later than the other of the two signals is transmitted through the slower channel. The selected time difference between the transmission of the two signals is proportional to the ratio of signal propagation delay difference between channels. Accordingly the signal through the faster channel will overtake and intercept the signal propagating through the slower channel, at the selected data acquisition unit. Each data acquisition unit may have two or more input channels. Each input channel is connected in turn to the data channel through a stepping switch or multiplexer. The interrogation signal may exist in one of two or more states. In the first state, the interrogation signal resets the multiplexer. In the second state, the interrogation signal advances the multiplexer to the next input channel in sequence.

17 Claims, 4 Drawing Figures

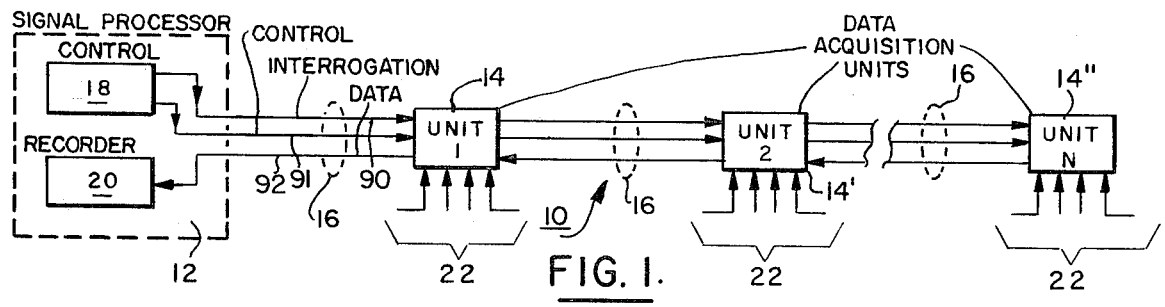
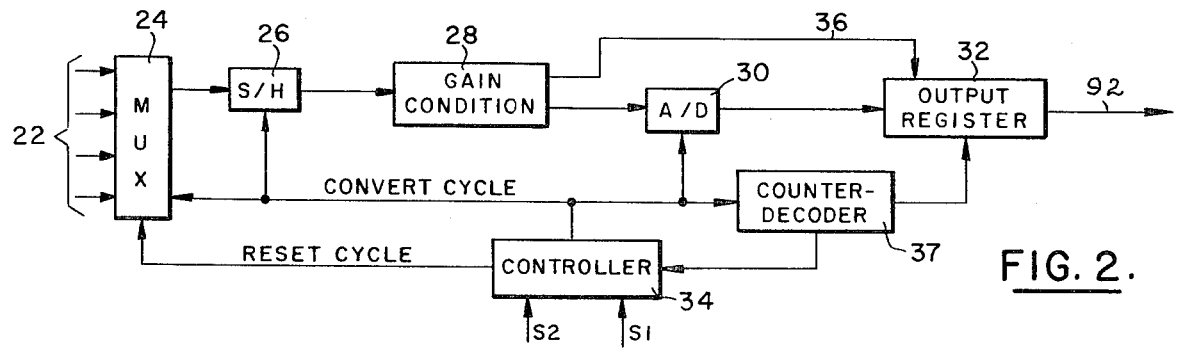
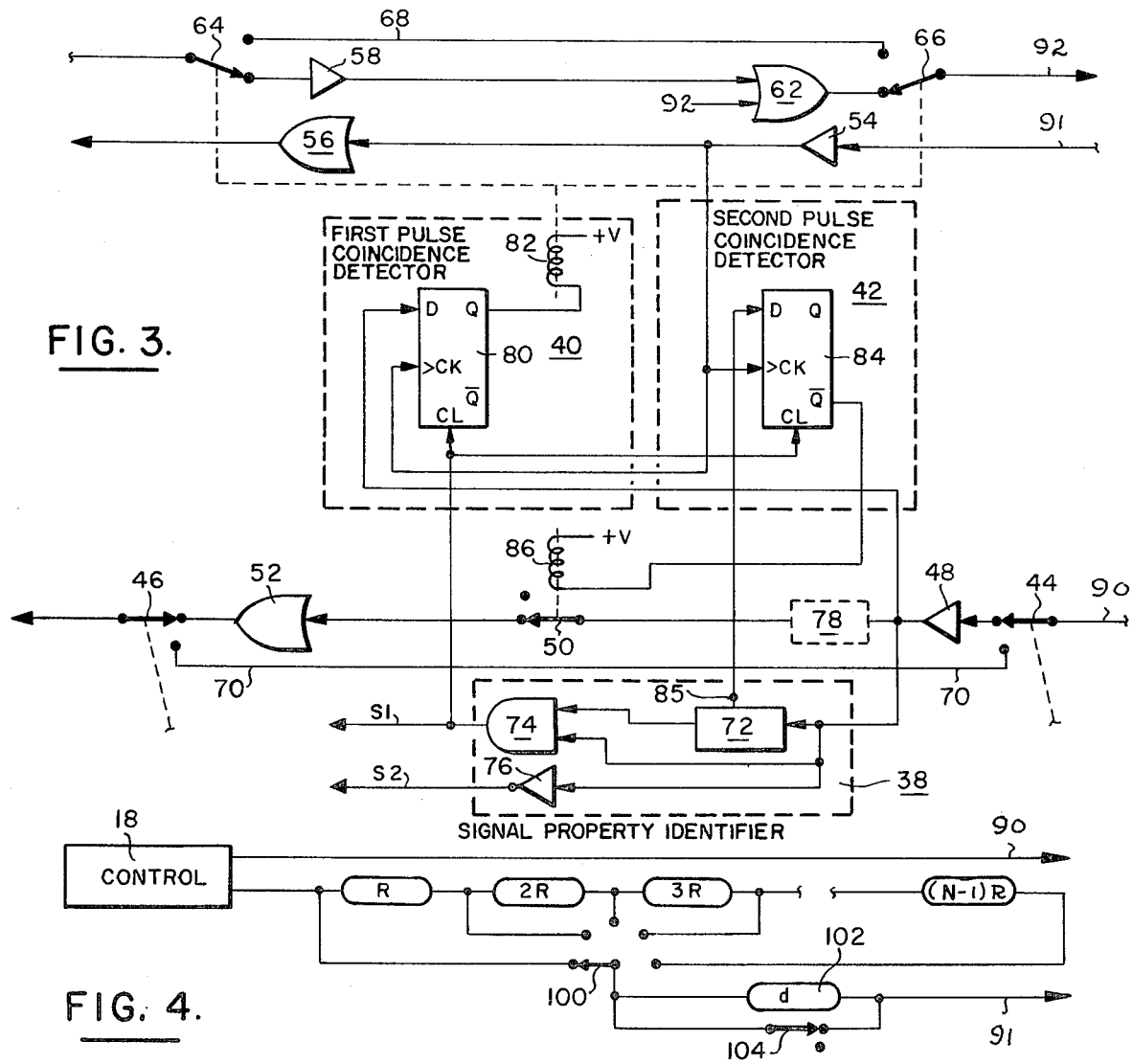

SEISMIC DATA TELEMETERING SYSTEM

BACKGROUND OF INVENTION

1. Field of Invention

This invention relates to a telemetry system as applied particularly to seismographic exploration.

2. Related Prior Art

In seismic exploration, acoustic signals are injected into the earth. The acoustic signals radiate downwardly and are reflected from subsurface formations. The reflected acoustic signals then return to the earth's surface where they are detected by a plurality of seismic sensors or sensor groups. The sensors are deployed in groups along a cable with a spacing within the group of 10 to 20 feet or more. A plurality of groups may be distributed along a multiconductor cable system which typically may be as long as 10,000 feet. The detected, reflected acoustic signals are then transmitted to a central signal-recording system.

In accordance with conventional seismographic surveying practice the sensor groups are located along the cable at increasingly greater distances from the recording system. There is therefore, a nearest and farthest sensor group relative to the recording system. Commonly the plurality of seismic sensor groups transmit data to the recording system through a like number of physically separate transmission channels, typically two-wire cables. Whereas previously, standard practice called for use of about 50 data channels, modern exploration may require 500 channels of data. Because of the great expense of a large number of individual transmission channels, single-channel time-multiplexed telemetry systems (SCTMTS) have been proposed.

In such a (SCTMTS) system, the recording system polls each sensor group in sequence and identifies the individual sensor groups by an address unique to that sensor group. Alternately, various clocking schemes have been proposed wherein each sensor group has a unique response to one or more clocking signals emitted by the recording system. The previously suggested telemetry systems have a common characteristic in that each sensor group must in some physical way, be unique and distinguishable from the other sensor groups on a per-channel basis. Additionally in the case of a multichannel sensor group array, complex addressing systems must be used to change channel assignments, as various sensors are advanced in accordance with the so-called common depth point seismic exploration method. Thus, if each one of a large number of sensor groups must be identified uniquely, there is a likelihood of erroneous group identification. It would be very advantageous and would avoid confusion if all seismic sensor groups were identical and inerchangeable. Such a system has been proposed in co-pending application Ser. No. 446,862.

SUMMARY OF THE INVENTION

This invention provides a method for initiating a desired switching action in one of a plurality of data acquisition units. The acquisition units are positioned in a desired pattern at locations remote from a central signal processor which includes control signal transmitter means. The acquisition units are substantially equally spaced from one another along one or more transmission links. The acquisition units are connected to the control means by two signal transmission links. The travel velocity of a signal through the first link is less than that through the second link. A first signal is transmitted through the first link to the plurality of acquisition units. A second signal is transmitted through the second link after a preselected time delay following transmission of the first signal. The signal traveling through the second link overtakes the signal traveling through the first link at the selected acquisition unit. When the simultaneous arrival of both signals is detected at the selected acquisition unit, the desired operation is initiated.

This invention also provides a method for initializing a desired switching action in all of the acquisition units. The first signal may be characterized by one of a plurality of properties or states. When the state of the first signal is identified, a desired switching action is initiated in all of the acquisition units in turn in response to the particular state of the first signal.

This invention further provides a system for transmission and selective control of sub-multiplexed seismic data over a signal transmission link to a central signal processor. A plurality of data acquisition units are connected to a central signal processor through the signal transmission link. The data acquisition units are evenly spaced apart from one another in an array at increasingly greater distances along the transmission link from the central processor. The signal transmission link includes an interrogation channel, a control channel, and a data channel. The signal propagation velocity through the interrogation channel is different from the propagation velocity through the control channel.

Associated with each data acquisition unit are a plurality of analog data input channels, a multiplexer or channel-switching means, an analog-to-digital converter, and an output-storage means. The input signals from the input channels are multiplexed, converted to digital form, and stored in the output signal storage means.

The output signal storage means of each data acquisition unit is connected to a recording means in the central processor through the data channel of the signal transmission link. The data acquisition units further are provided with a signal-property identifier and first and second signal coincidence detectors.

At selected sample intervals, the control means transmits an interrogation signal through the interrogation channel to each data acquisition unit in sequence. The interrogation signal is characterized by one of a plurality of properties. When the signal-property identifier responds to an interrogation signal having a first property, it resets the multiplexer. When the signal-property identifier detects a signal having a second property, it advances the multiplexer and outputs data from the output signal storage means to the data channel for transmission to the recording means.

At a preselected time, different from the time of transmission of the interrogation signal, a control signal may be transmitted through the control line by the control means. The preselected time difference is $(n-1)R$, where $n$ is an integer representing the rank of the $n$th data acquisition unit and R is the signal travel time difference of the signals through the interrogation and control channels between any two data acquisition units.

Accordingly, the interrogation and control signals will become coincident at $n$th data acquisition unit. When the first signal coincidence detector of data acquisition unit $n$ detects the substantially simultaneous arrival of a control signal and of an interrogation signal, the first signal coincidence detector bypasses the data-output circuit of unit n. The time of transmission of the control signal may be timeshifted by an interval $[(n-1)R+d]$ where $d$ is the time shift. When the second signal coincidence detector senses the substantially simultaneous arrival of an interrogation signal and of a timeshifted control signal, the second signal coincidence detector inhibits further travel of the interrogation signal to units positioned after selected data acquisition unit n.

The interrogation signal is preferably a pulse of preselected duration or width. The property of an interrogation signal is defined by its width. A wider pulse is defined as having a first property; a narrower pulse is defined as having a second property. The width of a narrower pulse is preferably about one-half the width of a wider pulse. The width of a wider pulse is preferably less than one-half of the preselected sample interval.

BRIEF DESCRIPTION OF THE DRAWINGS

FIG. 1 is a schematic representation of a multi-channel seismic data telemetry system showing the data acquisition units interconnected through a multichannel telemetry link to a central signal processor;

FIG. 2 shows the signal conditioning logic contained by each data acquisition unit;

FIG. 3 is a diagram of the signal-property identifier and of the first and second signal coincidence detectors; and FIG. 4 illustrates a means for delaying transmission of a control signal following transmission of an interrogation signal and for applying a time shift to the control signal.

DESCRIPTION OF THE INVENTION

FIG. 1 is an overall schematic illustration of a seismic data telemetry system generally shown as 10. System 10 includes a central data processor 12, and a plurality of identical spacedapart multi-channel data acquisition units 14, 14', 14'', whose inputs may be connected to seismic transducers (not shown). In a preferred embodiment the data acquisition units are interconnected in series with data processor 12, by a three-channel, signal-transmission link 16. For simplicity, three data acquisition units 14, 14', 14'' are shown but up to 100 or more such units may be used. Data acquisition units 14, 14', 14'' are disposed along a line at increasingly greater distances from data processor 12. Separation between the acquisition units is preferably constant, typically about 200 to 300 feet.

Central data processor 12 includes a control means 18 and a recording means 20. Recording means 20 may be a magnetic tape recorder of any well known type. Control includes a signal transmission means for transmitting a multi-state interrogation signal at preselected sample intervals and/or a control signal through channels 90 and 91, respectively, of three-channel signal transmission link 16 which may be a telemeter system.

The interrogation signal propagates through the telemeter link, polling each data acquisition unit 14, 14', 14'' in sequence. In response to the interrogation signal, each data acquisition unit transmits its acquired data to recording means 20, through channel 92 of telemeter link 16.

In a preferred embodiment of this invention, the interrogation signal has one of a plurality states or properties. The preferred interrogation and control signals are square-wave pulses, although other types of signals may be used. The propagation velocity of a pulse through the interrogation channel 90 is different from the propagation velocity of a pulse through the control channel 91.

If and when a data acquisition unit, such as 14', becomes defective, it must be bypassed so that data transmitted from a more remote unit, such as 14'', will not be affected. A control pulse is transmitted from control means 18 over control channel 91. At a selected unit such as 14', the control pulse overtakes and becomes coincident with the interrogation pulse due to the different propagation velocities in channels 90 and 91. Coincidence of the two pulses at unit 14' will cause that unit to be bypassed.

Referring now to FIGS. 1 and 2, wherein like components bear the same numbers, the identical data acquisition units 14, 14', 14'' are provided with a plurality of input channels 22. The units also contain signal-conditioning logic including a multiplexer 24, sample and hold 26, gain-conditioning amplifiers 28, analog-to-digital converter 30, and an output signal storage means such as register 32. These components interconnect the signal input channels 22 with data channel 92. The preferred system will be described in digital terms, but an analog embodiment can also be used.

The switching means, such as the multiplexer 24 and sample and hold 26 are of conventional types well known to the seismic art. Gain-conditioning amplifier 28 may be an instantaneous floating-point binary gain-ranging amplifier of any well-known type. The gain-conditioning amplifiers provide a four-bit gain code to indicate their gain setting for each data sample. The analog-to-digital (A/D) converter 30 may for example, be a Micronetics MN 5212 12-bit converter, although a converter of greater or lesser resolution may be used. Output signal storage means 32 may be a conventional 16-bit or more serial-in, serial-out shift register. In a preferred embodiment, 16-bit register 32 has a capacity for 12 data bits from the A/D converter and four gain code bits from the gain-conditioning amplifiers.

A controller S2, on lines S1 or S2, is provided which is activated by signals S1 or S2, respectively. Signals S1 or S2 are generated in response to an interrogation pulse having either a first state or a second state, respectively. For a signal S1, the controller resets multiplexer 24 to channel 0, a dummy channel. In response to a signal S2, following a signal S1, controller 34 advances multiplexer 24 to the first input channel in sequence, to allow sample-and-hold 26 to sample an input signal from the first channel. The signal sample is amplified by the gain-conditioner 28 and is presented to A/D converter 30. In a preferred embodiment, the amplification factor is expressed as a four-bit gain code. When the next S2 signal is generated, the controller advances multiplexer 24 to the next channel and at the same time causes A/D converter 30 to convert the gain-conditioned sample from the first channel to a digital number. At the beginning of the convert cycle, the four-bit gain code is transferred in serial order from gain conditioner 28 to output register 32 over line 36. As the A/D conversion proceeds, the 12 bits representing the digital number are sent serially to output register 32 from A/D converter 30. In register 32, the 12 data bits are combined with the four gain-code bits to form a 16-bit digital data word corresponding to the sample from the first channel.

When the convert cycle for channel $k$ begins, controller 34 transfers to data channel 92, the digital data word for channel $k-1$, previously resident in output register 32. Counter-decoder 37 counts the bits serially strobed out of register 32 and informs controller 34 to terminate the transfer of the data bits when the count is complete.

Referring now to FIG. 3, each one of data acquisition units 14, 14', 14'' includes a signal-property identifier 38 and first and second signal coincidence detectors 40 and 42, shown enclosed by dotted lines. Connected in series with interrogation channel 90 are power-loss bypass switches 44, 46, line receiver 48, interrogation-signal disable switch 50 and line driver 52. Control channel 91 is provided with a line receiver 54 and a line driver 56. Data channel 92 is furnished with a line receiver 58, and an OR-gate/line driver 62. Switches 64 and 66 cause data output to be bypassed over bypass line 68 when deactivated.

Signal-property identifier 38, consisting of a tapped delay line 72, an AND-gate 74, and an inverter 76, is adapted to identify the state of an interrogation signal in a manner now to be described. The interrogation signal is substantially a square wave, having a specified width, which becomes active when true and inactive when false. The state of a pulse is herein defined by its width, although with appropriate circuitry any other parameter thereof such as pulse height could also be used as a discriminant. A wide pulse defines an interrogation pulse in the first state. The width of a wide pulse must be greater than the delay time of delay line 72, but less than one-half of the preselected sample interval. An interrogation pulse in the second state must be clearly distinguishable from an interrogation pulse in the first state and is less than half the width of a wide pulse. In a preferred embodiment, the delay time of delay line 73 is 1000 nanoseconds (ns), a wide pulse is 1200 ns long, and a narrow pulse is 400 ns long. Additional pulse widths could be used to provide a multi-property pulse if suitable changes are made to the signal-property identification logic.

When control means 18 transmits an interrogation pulse in the first state, the pulse propagates through interrogation channel 90, through switch 44 to line receiver 48, through switch 50 to line driver 52, switch 46, and on to the next data acquisition unit in sequence. This pulse also passes through delay line 72. At the end of 1000 ns, the leading edge of this pulse emerges from the exit of the delay line but at this point the trailing edge of the pulse is still visible a the entry of the delay line. Accordingly, both inputs to AND-gate 74 go true, thereby generating a 200 ns signal on line S1 having a positive-going leadig edge. As previously described, when controller 34 (FIG. 2) detects a signal on line S1, it resets multiplexer 24. The trailing edge of the wide interrogation pulse will generate a positive-going pulse on line S2, the output of inverter 76, 200 ns after S1 goes true. But controller 34 is programmed to ignore an S2 signal if it follows too closely an S1 signal.

An interrogation pulse in the second, narrow, state propagates through channel 90 to delay line 72 and to inverter 76. Since the pulse width is too narrow to be seen simultaneously at the entrance and exit of delay line 72, no signal will be generated on line S1. However, the trailing edge of the narrow pulse will appear at the output of inverter 76 as an active signal on line S2. When controller 34 detects an active S2 signal, as mentioned previously, it will advance multiplexer 24 to the next input channel in sequence, initiate a convert cycle, and output a data signal through channel 92 to recording means 20.

As above described, each data acquisition unit may have 16 or more analog input channels. Accordingly, to sample each input channel in sequence, an interrogation pulse in the first state is first transmitted by control means 18. As the wide interrogation pulse propagates along interrogation channel 90 to each data acquisition unit in sequence, it resets multiplexer 24 contained in each unit. Thereafter, a series of 16 or more interrogation pulses in the second state are transmitted. Each pulse in the second state advances multiplexer 24 to sample in turn, each one of the input channels 22 and to transmit the corresponding data signals from the data acquisition units 14, 14', 14'' to recording means 20 through data channel 92.

In a preferred embodiment, the 16 channels in all data acquisitions units are sampled within one millisecond; accordingly, the sub sample interval will be 62.5 $\mu$s. The two-way interrogation pulse propagation delay through interrogation channel 90 between the data acquisition units, provides a time window during which the data signals can be transmitted from the respective data acquisition units 14, 14', 14' without mutual interference.

Bypass switches 44, 46 and 64, 66 are relay-actuated by any well-known means and are shown in the power-on position. In the event of a power failure in a particular data acquisition unit, both sets of switches will switch to bypass lines 68 and 70. Thus, interrogation pulses and data to and from the other more remote data aquisition units pass freely through the defective unit over bypass lines 68 and 70.

A data acquisition unit such as 14' may become defective requiring it to be bypassed or it may become desirable to terminate further transmission of an interrogation pulse at a specified unit. These special functions are enabled by a control signal.

The total travel time of the interrogation pulse to a remote data aquisition unit, such as 14' depends on the propagation delay time through the interrogation channel to that unit. The travel time to channel $n$ is the sum of the propagation delays between all previous data acquisition units. Similarly, the propagation delay time of a control pulse through the control channel to unit $n$ is the sum of the delays in the control channel between all previous units closer to control means 18 than unit $n$. If the propagation velocities through the two channels are different, at the $n$th data acquisition unit, a pulse propagating through the faster channel will arrive $(n-1)R$ earlier than the pulse through the slower channel, where $n-1$ is the number of spaces between the first $n$ data acquisition units and R is the signal travel-time difference, through the two channels, between units. Preferably the lead-in section between the central data processor and the first acquisition unit 14 is so constructed that the propagation delays of links 90 and 91 therein are the same and all differential delays are contained in the links between successive acquisition units.

For purposes of illustration, assume that the pulse propagation velocity is greater in the control channel than in the interrogation channel. Accordingly, if an interrogation pulse is transmitted from control means 18, and $(n-1)R$ later a control pulse is transmitted by control means 18, the control pulse will overtake and intercept the interrogation pulse at unit $n$.

It should be understood that both the interrogation and control transmission links could be characterized by identical propagation velocities. Delay lines can be inserted in one of the two channels at each data acquisition unit to create an effective propagation velocity difference. For example, a delay line 78 (shown by a dotted box in FIG. 3) can be inserted in the interrogation channel between line receiver 48 and disabling switch 50. Additionally, delay line 78 could serve as a substitute for delay line 72.

In response to the simultaneous presence of both a control pulse and an interrogation pulse in any state, first signal coincidence detector 40 becomes active. The leading edge of an interrogation pulse sets the D input of D-type flip-flop 80, which remains set for some desired set-interval such as 500 ns or the width in time of the interrogation pulse. The Q output of flip-flop 80 is normally false, activating relay 82 to hold switches 64 and 66 closed, as illustrated in FIG. 3. If a control pulse arrives within the set interval, it will be directed to the CK input of flip-flop 80, causing it to toggle Q to true. When Q goes true, relay 82 is released, causing switches 64 and 66 to make contact with bypass line 68. The set-interval is provided to allow for propagation delay irregularities between units.

Referring now to FIG. 4, in a preferred embodiment, control means 18 transmits an interrogation pulse through interrogation channel 90, having the lesser propagation velocity. Control channel 91 is connected to control means 18 through a tapped delay line having taps to provide cumulative delay times of R, 2R, 3R, (N−1)R via tap selector switch 100.

To bypass channel n, an interrogation pulse is first transmitted by control means 18 (FIG. 1) and then (n−1)R later a control pulse is transmitted. The control pulse will intercept and become coincident with the interrogation pulse at channel n, deactivating relay 82 (FIG. 3), thereby switching switches 64 and 66 to bypass line 68.

It may become desirable to disable further travel of an interrogation pulse to units positioned after data acquisition unit n. To perform this function, the control pulse is time-shifted to follow an interrogation pulse by a delay of [(n−1)R+d] where d is the time shift.

Referring again to FIG. 3, in second pulse coincidence detector 42, the D input of flip-flop 84 is connected to a tap 85 on tapped delay line 72. The delay time between entry of the leading edge of a pulse in delay line 72 and the appearance of the leading edge of the pulse at tap 85 is greater than the desired set-interval of flip-flop 80 in first pulse coicidence detector 40. In a preferred embodiment the delay time d to tap 85 is 600 ns. As previously described in pulse coincidence detector 40, when the interrogation pulse arrives, it will first set the D input of flip-flop 80 true for a period of 500 ns or the width of the interrogation pulse. At a time d later, the leading edge of the pulse appears at tap 85 of delay line 72. But by this time, the 500 ns set-interval of flip-flop 80 will have expired. Hence the pulse coincidence detector 40 becomes unresponsive to a control pulse at the CK input. However, the D input of flip-flop 84 will now become set to a logic-one by the delayed interrogation pulse. Therefore, a time-shifted control pulse arriving at the CK inputs of flip-flops 80 and 84 will do nothing to flip-flop 80 but will toggle flip-flop 84, causing the normally true $\bar{Q}$ output to go true. When $\bar{Q}$ of flip-flop 84 goes true, relay 86 is activated, opening disabling switch 50, thereby terminating further travel of the interrogation pulse to a unit positioned after data acquisition unit n.

Referring now to FIG. 4, the time shift d is imparted to the control pulse by a fixed delay line 102 when shorting switch 104 is opened. The time delay in line 102 is in the same as the time delay at tap 85 of delay line 72.

If either flip-flop 80 or 84 is toggled by the simultaneous presence of an interrogation pulse and a control pulse, it will remain in the toggled condition until cleared. Flip-flops 80 and 84 will become cleared only in response to an interrogation pulse in the first state in the absence of a coincident control pulse, when the output of AND-gate 74 goes true.

While this invention has been described with respect to particular embodiments, it is of course not limited thereto. For example, interrogation and control channels may be combined into one physical transmission channel by any of several well-known multiplexing means such as code-modulation. For example, interrogation signals and control signals may be coded differently and decoded at each acquisition unit after which different delays are applied to the two signals prior to transmission to the next acquisition unit. Even though the physical transmission lines are the same, in the terminology of the communication arts, two separate channels are considered to exist.

Also, while the present invention has been described in terms of equally spaced acquisition units, it is possible to apply the same principles to unequally spaced (or unequally delayed) units by constructing the sequential delay taps of FIG. 4 to correspond in sequence to the actual differences between delays in the signal and control transmission channels.

Moreover, while the novel features of this invention have been described with specific application to digital seismic data acquisition systems they are not restricted thereto.

What is claimed is:

1. A system for initiating a desired switching action in a selected one of a plurality of substantially identical, multiple input, seismic data acquisition units that are interchangeable without adjustment, spaced apart from one another by a substantial distance and in a constructive order in a known relationship to each other, comprising:

a control means located remotely with respect to said data acquisition units;

first and second transmission channels linking the control means with each one of said acquisition units, the signal propagation velocity in the first channel being less than the signal propagation velocity in the second channel;

a switching means in each acquisition unit;

a signal transmitter in said control means to transmit a first signal through the first signal transmission channel and to transmit a second signal through the second signal transmission channel, said second signal being delayed with respect to said first signal by a preselected time interval, said preselected time interval being an integral multiple of the signal propagation delay difference between said first and second signal transmission channels the multiplier of said integral multiple being equal to the number of data acquisition units intervening between said signal transmitter and said selected data acquisition unit; and signal coincidence detector means coupling said first and second signal transmission channels with said switching means, said detector means initiating the desired switching action when the first signal and the delayed second signal reach the selected acquisition unit substantially simultaneously.

2. In a system for transmitting signals by propagation-delay multiplexing from a plurality of remote, identical, seismic data acquisition units to a central signal processor, the data acquisition units being spaced apart in consecutive order according to rank, each one of said data acquisition units including: at least two signal input channels, an output signal storage means, and a switching means to sequentially couple the signal input channels with the output signal storage means, thereby to store temporarily the data signals acquired by the input channels, the improvement comprising:
 a signal transmission link for linking the central signal processor to said plurality of data acquisition units;
 an interrogation channel and a data channel in said signal transmission link;
 a control means in said central signal processor to transmit, through the interrogation channel to said data acquisition units, at preselected intervals an interrogation signal having one of a plurality of properties;
 a recording means in said central signal processor to receive data signals through the data channel from the output signal storage means in said data acquisition units;
 a detector means in each data acquisition unit to detect the property of the interrogation signal;
 means to interconnect the detector means with the interrogation channel, the switching means, and the output signal storage means; and said detector means being adapted
  a. to reset the switching means to an initial condition when the detector detects an interrogation pulse having a first property,
  b. to advance the switching means to the next input channel in sequence, and
  c. to transmit data signals from the output signal storage means through the data channel to the recording means when the detector detects an interrogation signal having a second property.

3. The system of claim 2, wherein:
 said transmission link further includes a control channel having a signal propagation velocity different from the signal propagation velocity of the interrogation channel, said control channel linking said central signal processor with said data acquisition units; and
 means in said central signal processor for transmitting an interrogation signal, and for transmitting a control signal at an instant of time which is different from the time of transmission of the interrogation signal, thereby to allow the control signal and the interrogation signal to become coincident at a preselected data acquisition unit.

4. The system of claim 3, wherein:
 each one of said data acquisition units includes a data-output bypass means; and
 a first signal coincidence detector coupling said interrogation and control channels with said data-output bypass means, said signal coincidence detector being adapted to cause said bypass means to bypass data signals from the preselected data acquisition unit in response to the substantially coincident arrival of an interrogation signal and a control signal.

5. The system of claim 4 and further including:
 an interrogation-signal disabling means connected to said interrogation channel in each one of said data acquisition units;
 means in said central signal processor to time-shift a transmitted control signal by a fixed time increment; and
 a second signal coincidence detector connecting the interrogation and control channels with said disabling means, said second signal coincidence detector being adapted, in response to the subtantially simultaneous arrival of an interrogation signal and a time-shifted control signal at the preselected data acquisition unit, to cause said disabling means to inhibit propagation of an interrogation signal to all data acquisition units positioned after the preselected data acquisition unit.

6. The system of claim 5 wherein:
 said interrogation signal is a square-wave pulse whose width defines its property.

7. The system of claim 6 wherein:
 a wide pulse defines an interrogation signal having a first property and a narrow pulse defines an interrogation signal having a second property.

8. The system of claim 7 wherein:
 the width of a wide pulse is less than one-half of said preselected sample interval.

9. The system of claim 8 wherein:
 the width of a narrow pulse is less than one-half the width of a wide pulse.

10. The method as defined in claim 1 wherein:
 said preselected time delay is an integral multiple of the signal travel time difference in said first and second signal transmission channels; and
 the multiplier of said integral multiple is equal to the number of data acquisition units between said signal transmitter and said selected data acquisition unit.

11. A method for multiplexing seismic signals from each channel of a plurality of identical and interchangeable data acquisition units each having a plurality of input channels, comprising the steps of:
 disposing the data acquisition units in spaced-apart relationship remotely with respect to a central signal processor;
 transmitting from said central signal processor to each said data acquisition unit, at preselected sample intervals, a first interrogation pulse having a first state;
 sensing at each said data acquisition unit said first interrogation pulse in said first state as a multiplexer reset signal;
 transmitting to said data acquisition units a plurality of second interrogation pulses having a second state at preselected subsample intervals;
 sensing at each said data acquisition unit said second interrogation pulses in said second state as multiplexer-advance and data-output signals.

12. The method of claim 11 wherein said preselected sample interval is at least one millisecond and the plurality of second interrogation pulses is equal to the number of input channels, less one.

13. The method of claim 11 wherein said preselected sample interval is less than one millisecond.

14. A method for initiating a first desired switching action in a selected one of a plurality of identical data acquisition units including the steps of:

disposing the data acquisition units in a consecutive order in a preferred pattern remotely with respect to a signal transmitter, said acquisition units being spaced apart in known relationship;

linking each acquisition unit to the transmitter by means of first and second signal transmission channels, the signal propagation velocity in the first channel being less than the signal propagation velocity in the second channel;

transmitting from the transmitter a first signal through the first transmission channel; and transmitting from the transmitter a second signal through the second transmission channel after a preselected time delay following the initiation of the transmission of said first signal, said preselected time delay being an integral multiple of the signal travel time difference in traveling between two consecutive acquisition units in said first and second signal transmission channels, the multiplier of said integral multiple being equal to the number of data acquisition units between said signal transmitter and said selected data acquisition unit, whereby said delayed second signal overtakes said first signal at said selected acquisition unit to initiate said first desired switching action.

15. The method of claim 14 and further including the step of:

time-shifting the delayed second signal by a predetermined time interval, so that the delayed, time-shifted second signal intercepts said first signal at said selected acquisition unit to initiate a second desired switching action in said selected data acquisition unit.

16. In a system for transmitting signals by propagation-delay multiplexing from a plurality of remote, identical, seismic data acquisition units to a central signal processor, the data acquisition units being spaced apart in consecutive order, each one of said data acquisition units including: at least two signal input channels, an output signal storage means, and a multiplexer switching means to sequentially couple the signal input channels with the output signal storage means, thereby to store temporarily the data signals acquired by the input channels, the improvement comprising:

a signal transmission link for linking the central signal processor to said plurality of data acquisition units;

an interrogation channel and a data channel in said signal transmission link;

a control means in said central signal processor to transmit, at preselected intervals, an interrogation signal through the interrogation channel to said data acquisition units;

a recording means in said central signal processor for receiving data signals through the data channel from the output signal storage means in said data acquisition units;

a detector means in each data acquisition unit for detecting the interrogation signal;

means for interconnecting the detector means with the interrogation channel, the multiplexer switching means, and the output signal storage means;

means to initiate the transmission of data signals from the output signal storage means through the data channel to the recording means when the detector detects an interrogation signal;

a control channel included in said transmission link having a signal propagation velocity different from the signal propagation velocity of the interrogation channel, said control channel linking said central signal processor with said data acquisition units;

means in said central signal processor for transmitting a control signal at an instant of time which is different from the time of transmission of the interrogation signal, thereby to allow the control signal and the interrogation signal to become coincident at a preselected data acquisition unit; and means at each said acquisition unit to perform a switching action upon the receipt of said coincident interrogation and control signals.

17. A method of remotely signaling a selected one of a plurality of identical seismic data acquisition apparatus, said apparatus being interchangeable without adjustment and being equally spaced apart from one another by a substantial distance in consecutive order, the method comprising:

transmitting from a transmitter to the selected apparatus a first signal and a more rapidly traveling second signal;

delaying transmission of said second signal with respect to the instant of transmission of said first signal so that said first and second signals arrive substantially simultaneously at the selected apparatus, the transmission delay time being an integral multiple of the signal travel time difference between any two adjacent apparatus and the multiplier of said integral multiple being equal to the number of apparatus intervening between said transmitter and said selected apparatus.

* * * * *